United States Patent [19]
Oesterle

[11] 3,990,968
[45] Nov. 9, 1976

[54] MEANS FOR INCREASING THE FLOW ACROSS A REVERSE OSMOSIS MEMBRANE USING AN ALTERNATING ELECTRIC FIELD

[75] Inventor: Kurt M. Oesterle, Kusnacht, Switzerland

[73] Assignee: Desares Stiftung fur Forderung der Forschung zur Entsalzung des Wassers, Switzerland

[22] Filed: May 17, 1974

[21] Appl. No.: 470,929

Related U.S. Application Data

[63] Continuation-in-part of Ser. No. 173,003, Aug. 19, 1971, abandoned.

[52] U.S. Cl. .................................. 210/19; 210/23 H
[51] Int. Cl.² .......................................... B01D 13/00
[58] Field of Search .................. 210/19, 22, 23, 506, 210/243; 204/180 P

[56] References Cited

UNITED STATES PATENTS

| | | | |
|---|---|---|---|
| 3,246,767 | 4/1966 | Pall et al. | 210/506 |
| 3,305,481 | 2/1967 | Peterson | 210/19 |
| 3,491,022 | 1/1970 | Huff | 210/23 X |

FOREIGN PATENTS OR APPLICATIONS

| | | | |
|---|---|---|---|
| 7,007,856 | 12/1971 | Netherlands | 210/22 |

*Primary Examiner*—Frank A. Spear, Jr.
*Attorney, Agent, or Firm*—Hill, Gross, Simpson, Van Santen, Steadman, Chiara & Simpson

[57] ABSTRACT

Method for removing a solute from solution, particularly for water desalination, which involves contacting a semi-permeable membrane with the solution, and impressing an alternating electric field on the contacting surface, the field having a frequency corresponding to the relaxation frequency of the solute.

6 Claims, 5 Drawing Figures

MEANS FOR INCREASING THE FLOW ACROSS A REVERSE OSMOSIS MEMBRANE USING AN ALTERNATING ELECTRIC FIELD

REFERENCE TO RELATED APPLICATION

This application is a continuation-in-part of my copending application Ser. No. 173,003 filed Aug. 19, 1971, now abandoned.

BACKGROUND OF THE INVENTION

1. Field of the Invention

This invention is in the field of removal of dissolved materials from water by the reverse osmosis technique implemented with an applied alternating electric field to improve the flow rate through the membrane.

2. Description of the Prior Art

The reverse osmosis process for water desalination has become of growing importance. The main reason for this importance is that in contrast to the normal methods for water desalination, the energy consumed by the reverse osmosis process is very small. However, a disadvantage of the process is that the flow per day and area of the active surface of the membrane is rather small. In the past twenty years, the development of the reverse osmosis process has proceeded in two principal directions. In one, small flow rate across the membrane is compensated for by increasing the membrane surface per unit of volume in a desalination module. This approach has been quite successful in the use of a hollow fiber system which uses billions of fibers in one module, producing a large osmotic surface so that a small flow rate is acceptable.

Another way for improving the through-put is to increase the water flow across the membrane. For this purpose, there was developed a multitude of synthetic polymer resins as the basic membrane materials. In recent times, this synthetic polymer material was pigmented with minerals, metal oxides or metal hydroxides, using the interfacial effects of the pigment-membrane-resin interaction.

It is well known that after a short working life, the flow across the membrane decreases not only due to the compaction effect on the membrane by high pressure but also by an increase of Donan potential. The Donan potential is the result of accumulation of salt or salt solutions across the membrane, particularly on the feed side surface of the membrane. These concentrations produce a potential which acts in opposition to the desalination reaction.

The accumulation of salt along the membrane surface must be eliminated without damaging the product. Consequently, there have been many suggestions in the art on how to eliminate superficial salt accumulations. Some of the means suggested have been using a high velocity of the feed fluid alongside the membrane surface, oscillation of the membrane, or using ultrasonic waves directed toward the membrane surface.

All of these means produce a certain improvement but they cannot remove the ultimate salt layers from the surface and the interior of the membrane. Consequently, a reduced yield may result.

SUMMARY OF THE INVENTION

This invention proceeds on the concept of exercising a motive power on molecules, macromolecules and particles of the feed solution in the immediate neighborhood of the membrane surface. This motive power is produced by electric accelerating forces caused by an alternating electric field, and using the highest gradient possible of dielectric constants at the infinitesimal surface layer of the membrane surface.

The method of the present invention involves impressing an alternating electric field on the contacting surface, the field having a frequency corresponding to the relaxation frequency of the solute, the frequency being in the range from about 30 to 10,000 Hertz. The present invention can make use of either pigmented or unpigmented membranes composed of synthetic resins.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1A:
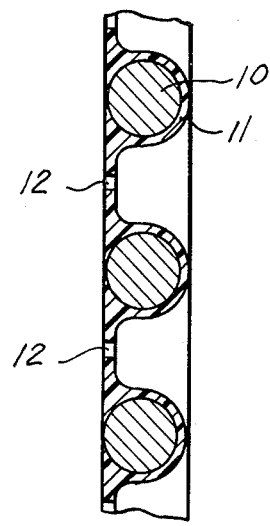
FIG. 1A is a cross-sectional view on an enlarged scale of one type of membrane which can be used for the purposes of the present invention.

It is known that at the boundary of two bodies with different dielectric constants, an electric field will produce an apparent density charge across its boundary. This apparent charge density exerts an accelerating force on any other electric charge such as the charge on a hydrated ion in the vicinity of the membrane surface. Since in the system of the present invention, the distance between the membrane surface and the molecules of the solution is very small, the force on the water molecules and the hydrated ions can become very large. Consequently, a relatively small applied voltage will be sufficient to produce large accelerating forces.

When a liquid containing ionizable molecules or microparticles is subjected to an alternating electric field, the liquid can take up a maximum of electric energy when the frequency of the alternating electric field is correct and sufficient to move the sub-microscopic microscopic and even macroscopic particles. This energy is expressed by a dielectric loss factor at the relaxation frequency. If the substance is non-homogeneous and consists of different sizes of particles, more than one frequency can be impressed or harmonics or sub-harmonics of the applied frequency can be used. Expressed in another way, if the relaxation frequency of the main solute is $f$, then frequencies applied may be $nf$ or $f/n$, where $n$ in each case is an integer.

The determination of the relaxation frequency for particular material is, as noted, equivalent to the measurement of the dielectric loss factor. There are several commercially available measuring devices for making this measurement. One such device is the WTW multidecameter which employs a pair of oscillators, a mixer, and a variable capacitor, together with a display device such as a cathode ray tube for determining the dielectric loss factor. Another well known apparatus for making this measurement involves the use of a Schering bridge in which an oscillator is applied across the corners of a bridge circuit in which each arm consists of capacitive and resistance elements.

The measurement of relaxation frequency has also been described in publications of which the following are representative:

C. G. Montgomery, Technique of Microwave Measurements, New York 1947;

F. H. Muller & C. Schmelzer, Ergebnisse der Exakten Wissenschaften, Vol. 25, 1951, page 359 et. seq.;

F. Oehme, Dielektrische Messmethoden Verlag Chemie, 1962, pages 83 et. seq.;

K. M. Oesterle, Fatipec, 1962, pages 334 to 349.

In general, frequencies of about 30 to 10,000 Hertz are applicable for the desalination of salt water. Specifically, frequencies of around 500 Hertz are preferred, along with the harmonics and sub-harmonics. Voltages of about 20 to 150 volts are typical.

The membranes of the present invention make use of any of the well known resin materials for reverse osmosis membranes. Typical among such materials are cellulose derivatives, polyacrylic acid resins, styrene polymers and cross-linked or inter-linked polyvinyl polyvinylpyrrolidone, and others.

The present invention may make use of homogeneous diaphragms, so-called Reid diaphragms, or it may make use of heterogeneous diaphragms having a supporting layer and an active layer, so-called Loeb-Sourirayan diaphragms. Both types of diaphragms normally include pure synthetic resins, but in some cases they may include pigmented synthetic resins having active interfaces between the pigment particles and the resin molecules.

The pigments present in the matrix should have a particle size in the order of 3 to 10 microns, as larger particles are likely to project from the membrane layer and cause loss in separation capability. Suitable pigments may be metals or metal oxides such as zinc, tin, manganese, magnesium, aluminum, iron, or other oxides or hydroxides.

Figure 1B:
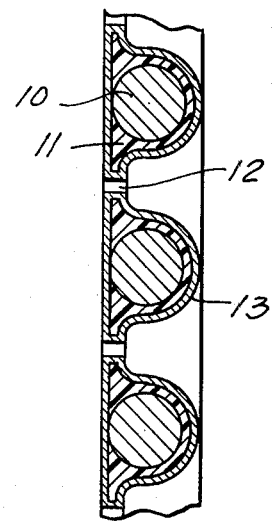
FIG. 1B is a highly magnified cross-sectional view of a modified form of the structure shown in FIG. 1A.
Figure 2:
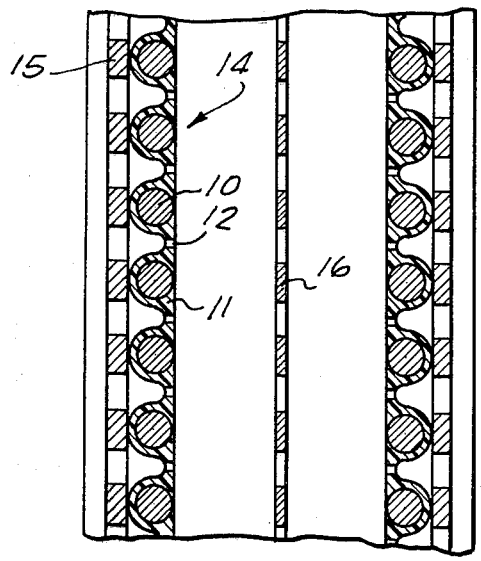
FIG. 2 is a fragmentary cross-sectional view illustrating a complete desalination unit employing the membrane of FIG. 1A.

Particularly preferred membranes are of the type shown in FIGS. 1A, 1B and 2 of the drawings. Referring to FIG. 1A, reference numeral 10 has been applied to a conductive metallic screen which is embedded in a pigmented plastic layer 11, the pigmented plastic layer closing most of the space between the individual wires of the screen 10, leaving only small pores 12. The structure of FIG. 1B is essentially the same as that of FIG. 1A with the addition of an additional metallic layer 13 such as an electrodeposited layer which serves to equalize surface flaws in the wires.

Membrane structures of the type shown in FIGS. 1A and 1B can be conveniently produced by precipitating the pigmented plastic molecules upon an electrically conducting carrier support. This can be done particularly well by a electrophoretic deposition from a bath containing the synthetic resin, wetting agents, emulsifiers, and the selected pigment.

Referring next to FIG. 2, a reinforced membrane 14 is shown bent into the shape of a tube and is supported on the outside by a metallic carrier 15. A galvanic or capacitive counterelectrode 16 is positioned within the interior of the tubular membrane. In the operation of this device, the tube is filled with sea water subjected to a pressure of up to 100 kilograms per square centimeter and at the same time an alternating voltage of 30 to 100 volts at a frequency of about 500 Hertz is applied to both electrodes. The desalted water is discharged through the pores of the membrane 14 while the sea water in the interior of the device becomes enriched with salt and flows off.

Figure 3:
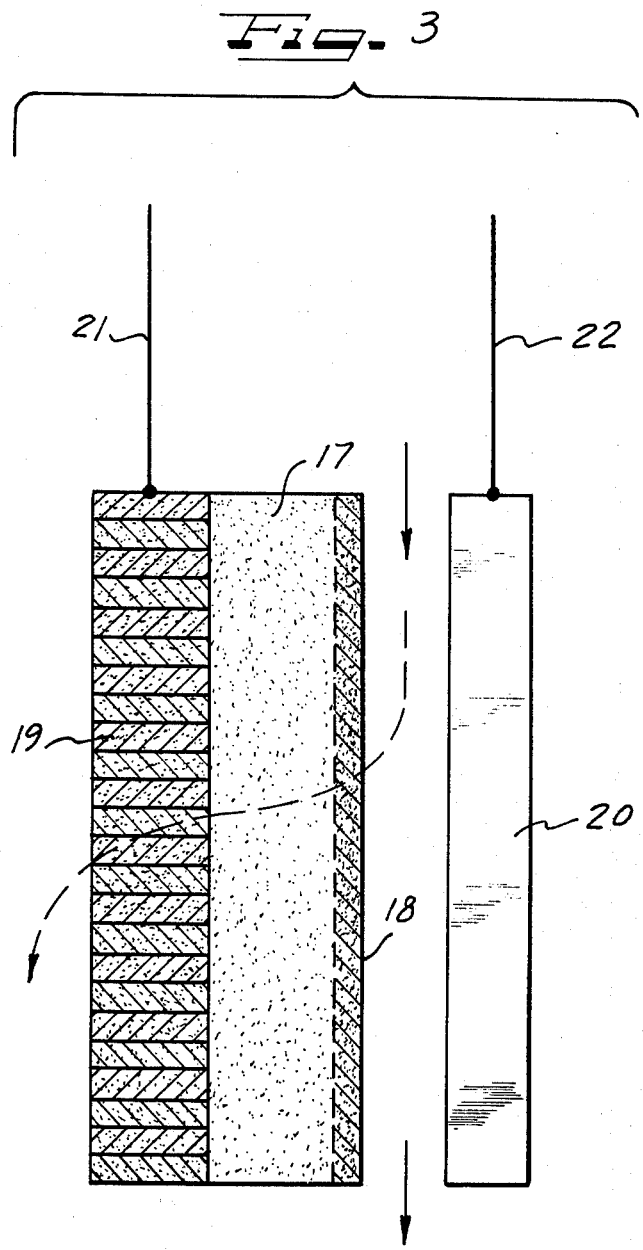
FIG. 3 is a somewhat schematic view of the membrane assembly which can be used for the purposes of the present invention.

A modified form of arrangement is shown in FIG. 3 of the drawings. This assembly makes use of a membrane 17 composed of synthetic resin material and having an active layer 18 containing a larger concentration of pigment particles per volume unit of the layer at the contacting surface. An electrode 19 in the form of a porous metallic plate operates as a counterelectrode and is embedded directly into the membrane. The other electrode is provided by means of a spaced plate 20. An alternating electric potential is applied between a pair of conductors 21 and 22 which are connected, respectively, to the electrode 19 and the electrode 20. The feed solution is introduced downwardly into the space between the electrode 20 and the active layer 18. The product diffuses through the membrane 17 as indicated by the dashed lines and may be recovered from the backside of the electrode 19, while the salt enriched feed water is removed.

Figure 4:
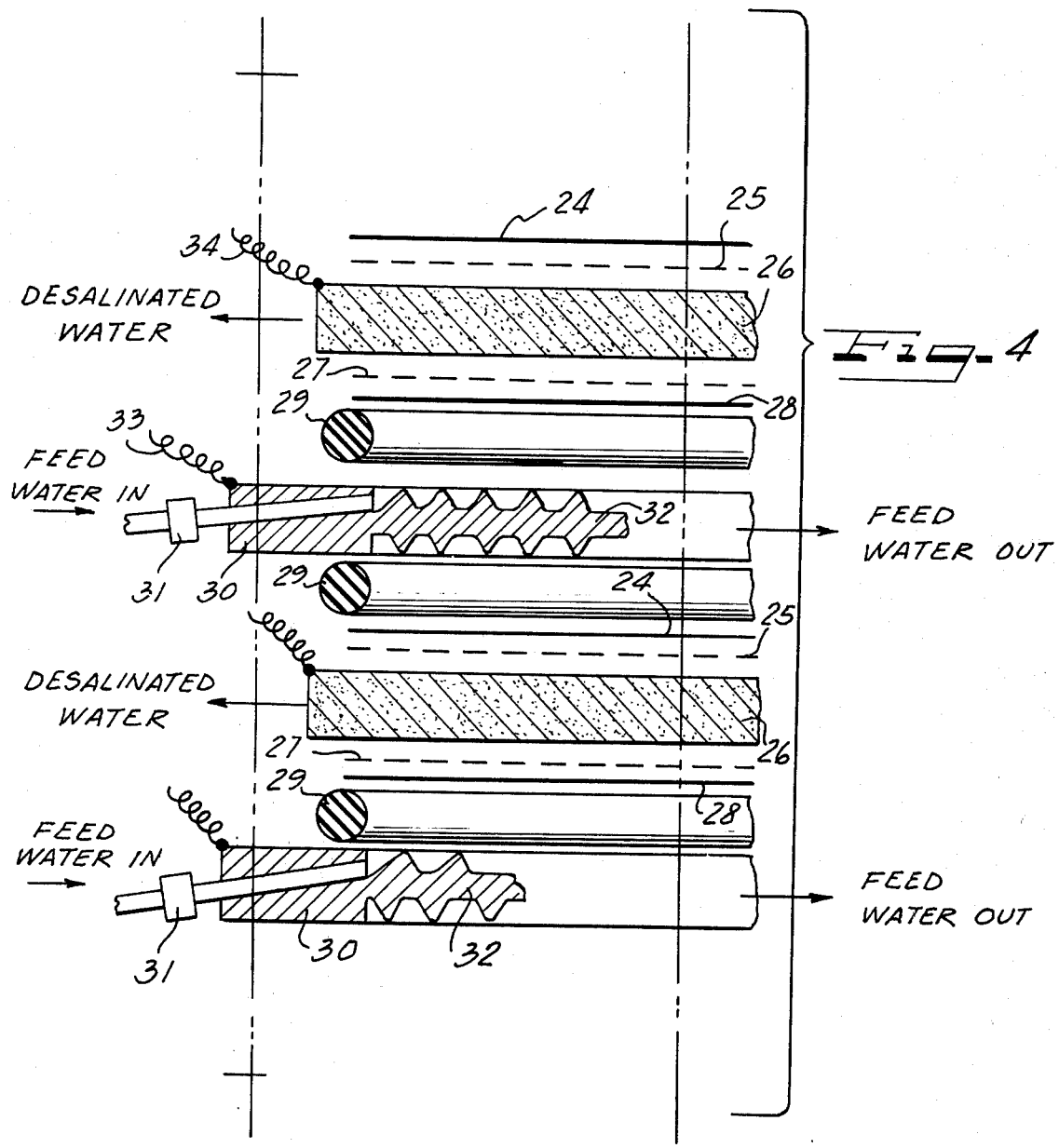
FIG. 4 is an exploded view of a multi-layer desalination cell which can be used for the purposes of the invention.

FIG. 4 is an exploded partial view of a multi-layer membrane assembly which can be used for the purposes of the present invention. Each individual cell unit includes an osmotic semi-permeable membrane 24, separated by means of a liner paper 25 from a porous metallic plate electrode 26. A second liner paper 27 separates the porous metallic plate 26 from another osmotic membrane 28. A plurality of O-rings 29 are interposed between the various portions of the multi-cell unit. A feed device 30 through which the sea water is introduced through an inlet 31 is provided with a spiral plate electrode 32 which distributes the feed water therealong. An alternating electric field is applied between conductors 33 and 34 which are respectively connected to the electrode 30 and to the electrode 26. The highly desalinated water is recovered along the edges of the porous metallic plate 26.

Pilot plant studies have been made under various conditions using homogeneous and non-homogeneous membranes. The following two tables illustrate the results obtained.

TABLE I

Pilot plant using homogeneous pigmented Reid membrane

| | without electric field | with electric field |
|---|---|---|
| feed concentration(salt) | 10000 p.p.m. | 10000 p.p.m. |
| temperature | 20° C | 20° C |
| pressure, kp/cm$^2$ | 50 | 50 |
| potential | — | 60 |
| current density, A/cm$^2$ | — | 0.3 |
| frequency, Hz | — | 500–5000 |
| flow across membrane liters/hr.m.$^2$ | 1.5 | 3.5 |
| salt rejection, % | 50 | 80 |

The unit "kp/cm$^2$" is equal to 9.81 newtons per square meter.

TABLE II

| Pilot plant with Loeb-Sourirajar membrane | | | | |
|---|---|---|---|---|
| membrane | feed conc, p.p.m. | pressure, kp/cm$^2$ | flow l/hr.m.$^2$ | salt rejection % | current density A/cm$^2$ |
| unpigmented cellulose acetate | 5000 | 100 | 40–120 | 80–97 | — |
| pigmented cellulose acetate | 5000 | 100 | 320–360 | 80–82 | |
| pigmented cellulose acetate, with electric field | 5000 | 100 | 960–1400 | 60–70 | 0.25 |

From the foregoing, it should be understood that the method of the present invention provides for satisfactory salt elimination in the reverse osmosis process while substantially increasing the through-put.

It should be evident that various modifications can be made to the described embodiments without departing from the scope of the present invention.

I claim as my invention:

1. The method of removing an ionic solute from solution which comprises contacting a surface of a semi-permeable pigmented membrane with said solution, and impressing an alternating electric field on the contacting surface, said field having a frequency corresponding to the relaxation frequency of the solute, said frequency being in the range from 30 to 10,000 Hertz.

2. A method according to claim 1 in which the frequency of said field is $nf$ where $f$ is the relaxation frequency and $n$ is an integer.

3. A method according to claim 1 in which the frequency of said field is $f/n$ where $f$ is the relaxation frequency and $n$ is an integer.

4. A method according to claim 1 in which an electrode is positioned at the side of said membrane opposite to the contacting surface.

5. A method according to claim 4 in which said electrode is located within said membrane.

6. The method of separating purified water from an aqueous salt solution which comprises contacting a reverse osmosis semi-permeable membrane with said solution, said membrane containing a metal or metal oxide pigment, and impressing an alternating electric field at the contacting interface between the membrane and said solution of a sufficient magnitude to exert an accelerating force on charged hydrated ions in the immediate vicinity of the membrane surface, said alternating field having a frequency corresponding to the relaxation frequency of the solids in solution, and being within the range of 30 to 10,000 Hertz.

* * * * *